United States Patent [19]

Katz et al.

[11] Patent Number: 5,099,075
[45] Date of Patent: Mar. 24, 1992

[54] PROCESS FOR REMOVING DOUBLE METAL CYANIDE CATALYST RESIDUES FROM A POLYOL

[75] Inventors: Lawrence E. Katz, Orange; John W. Reisch, Guilford, both of Conn.

[73] Assignee: Olin Corporation, Cheshire, Conn.

[21] Appl. No.: 608,520

[22] Filed: Nov. 2, 1990

[51] Int. Cl.$^5$ .............................................. C07C 41/34
[52] U.S. Cl. ...................................... 568/621; 568/614
[58] Field of Search ................................. 568/621, 614

[56] References Cited

U.S. PATENT DOCUMENTS

| | | | |
|---|---|---|---|
| 3,829,505 | 8/1974 | Herold | 260/611 |
| 3,941,849 | 3/1976 | Herold | 260/607 |
| 4,242,490 | 12/1980 | Emerson et al. | 528/77 |
| 4,335,188 | 6/1982 | Igi et al. | 428/458 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 502/169 |
| 4,721,818 | 1/1988 | Harper et al. | 568/120 |
| 4,877,906 | 10/1989 | Harper | 568/621 |
| 4,987,271 | 1/1991 | Watabe et al. | 568/621 |

FOREIGN PATENT DOCUMENTS 0383333 8/1990 European Pat. Off. ............ 568/621

OTHER PUBLICATIONS

Article entitled "Preparation of High Molecular Weight Polyols Using Double Metal Cyanide Catalysts", by J. L. Schuchardt and S. D. Harper pp. 360–364; 32nd Annual Polyurethane Technical Marketing Conference, Oct. 1–4, 1989.

*Primary Examiner*—Howard T. Mars
*Assistant Examiner*—R. Cook
*Attorney, Agent, or Firm*—Dale Lynn Carlson

[57] ABSTRACT

The present invention relates to a process for removing double metal cyanide complex catalyst residue(s) from polyol(s) which comprises after polyol formation the steps of: (a) contacting the catalyst residue-containing polyol with an effective amount of an oxidant to cause said residue(s) to form insoluble residues that are insoluble in the polyol, and (b) separating the insoluble residues from the polyol. In another aspect, the present invention relates to the oxidant-free polyol produced by the above process.

20 Claims, No Drawings

PROCESS FOR REMOVING DOUBLE METAL CYANIDE CATALYST RESIDUES FROM A POLYOL

FIELD OF THE INVENTION

This invention relates generally to polyols and, more specifically, to a process for removing double metal cyanide catalyst residues from a polyol.

BACKGROUND OF THE INVENTION

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The 'U.S. Pat. No. 505 patent discloses that these high molecular weight polyol products are useful in the preparation of nonionic surface active agents, lubricants and coolants, textile sizes, packaging films as well as in the preparation of solid or flexible polyurethanes by reaction with polyisocyanates.

An unfortunate result associated with the preparation of high molecular weight polyols using DMC catalysts is that DMC catalyst residues remain in the finished polyol. If not removed from the polyol, these catalyst residues tend to cause undesirable side reactions, thereby forming unwanted by-products which, in turn, cause odor and other storage problems.

Various solutions to the catalyst residue problem have been proposed. By way of illustration, U.S. Pat. No. 4,355,188 discloses that the removal of double metal cyanide catalyst residue can be accomplished by adding a strong base selected from the group consisting of potassium hydroxide, sodium hydroxide, potassium metal. and sodium metal, and incorporating an effective amount of ethylene oxide into the catalyst residue-containing polyol/alkali metal hydroxide mixture in order to convert the secondary hydroxyl groups of the polyol to primary hydroxyl groups. The process of the 'U.S. Pat. No. 188 patent has been found by the present inventors to not be effective in producing purified all-propylene oxide (i.e., ethylene oxide-free) purified polyols.

As another illustration, U.S. Pat. No. 4,721,818 discloses a process which comprises (a) incorporating into the catalyst residue-containing polyol an effective amount of an alkali metal hydride in order to convert the double metal cyanide complex catalyst into an insoluble ionic metal species separable from the polyol, and wherein the polyol hydroxyl groups are also converted to alkoxide groups, and (b) separating the insoluble ionic metal species from the polyol. Unfortunately, practical application of this process requires an intermediate step between steps (a) and (b) involving the incorporation of an effective amount of ethylene oxide into the catalyst residue-containing polyol/alkali metal hydroxide mixture in order to convert the secondary hydroxyl groups of the polyol to primary hydroxyl groups. Moreover, the process of the U.S. Pat. No. '818 patent has been found by the present inventors to not be effective in producing purified all-propylene oxide (i.e., ethylene oxide-free) purified polyols.

As yet another illustration, U.S. Pat. No. 4,877,906 discloses a complicated method involving (a) treating a DMC catalyst residue-containing polyol with alkali metal compound(s), (b) filtering and (c) treating the filtered polyol with a phosphorous compound to convert the soluble portion of the DMC catalyst residue into an insoluble portion, (d) filtering again, and then (e) recovering the polyol. This process is not as simple and straightforward as might be desired.

The processes disclosed in the above discussed patents have the disadvantage of being applicable only to specific polyols and utilizing treatment chemicals which themselves cause the formation of residues in the polyol. New approaches to providing catalyst residue removal that are inexpensive, generally applicable to all polyols, and do not themselves cause a residue problem would be highly desired by the polyol manufacturing community.

SUMMARY OF THE INVENTION

In one aspect, the present invention relates to a process for removing double metal cyanide complex catalyst residue(s) from polyol(s) which comprises after polyol formation the steps of:

(a) contacting the catalyst residue-containing polyol with an effective amount of an oxidant (preferably selected from the group consisting of: oxygen-containing gas(es), peroxide(s), acids, and combinations thereof) to cause said residue(s) to form insoluble residues that are insoluble in the polyol, and (b) separating the insoluble residues from the polyol.

In another aspect, the present invention relates to the oxidant-free polyol produced by the above process.

These and other aspects will become apparent upon reading the following detailed description of the invention.

DETAILED DESCRIPTION OF THE INVENTION

In accordance with the present invention, it has now been surprisingly found that treatment of a DMC catalyst residue-containing polyol with an oxidant causes the treated residue to become insoluble in the polyol, thereby forming a dispersion or precipitate of residue particles in the polyol. The residue can then be easily separated from the polyol.

The advantages of the process of the present invention are readily apparent in view of process simplicity and applicability to a wide range of polyols without the requirement for ethylene oxide capping of the polyols. The oxidation processes of this invention contain no metal ionic species that typically cause contamination of the polyol. In contrast, the process of U.S. Pat. No. 4,721,818, discussed hereinabove, does require the addition of ionic metal species, thereby necessitating the additional step of treatment with a silicate compound to remove the added ionic metal species.

The oxygen-containing gas useful as an oxidant in the present invention is suitably any such gas, preferably oxygen, air, ozone, or a combination thereof, and the like.

The acid useful as an oxidant in the present invention is suitably any acid, such as a mineral acid or a Lewis acid such as sulfuric acid, phosphoric acid, hydrochloric acid, nitric acid, antimony pentachloride, boron trifluoroetherate, toluene sulfonic acid, combinations thereof, and the like. The preferred acid is sulfuric acid.

The peroxide useful as an oxidant in the process of the present invention is suitably any peroxide, or hydroperoxide such as hydrogen peroxide, t-butyl peroxide, t-butyl peroxypivalate, decanoyl peroxide, lauroyl peroxide, propionyl peroxide, acetyl peroxide, combinations thereof, and the like.

The treatment time for contacting the DMC catalyst-containing polyol with the oxidant is generally between a few minutes or less and ten hours or more, preferably between about one and about four hours. The treatment temperature is suitably between 70° C. and about 140° C., preferably between about 90° C. and about 120° C.

The oxidant(s) is generally employed, if in liquid form, in a total amount of between about 5% and about 0.02%, preferably between about 0.40% and about 0.15% based upon the total weight of the polyol and may be adjusted based upon the total amount of DMC catalyst residue in the polyol. If a gaseous oxidant is employed, it is used in an amount sufficient to cause formation of the insoluble catalyst residues.

In a particularly advantageous aspect of the present invention, an oxygen-containing gas or hydrogen peroxide is utilized in combination with sulfuric acid to produce enhanced efficacy of separation of the treated DMC catalyst residue from the polyol.

Separation of the treated residue from the polyol is suitably effected utilizing well-known techniques such as filtration, extraction, centrifugation, or a combination thereof alone or in combination with conventional filter aids such as diatomaceous earth, alumina, MAGNESOL, CELITE, silica gel, or the like. Extraction, if used, is suitably conducted with water in the presence or absence of a nonpolar solvent, such as petroleum ether, ligroin, toluene, and the like.

The polyols useful in the present invention can be prepared, according to well-known methods, by condensing an alkylene oxide, or a mixture of alkylene oxides using random or step-wise addition, with a polyhydric initiator (such as a diol or triol initiator) or mixture of initiators, as is well-known in the art. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The alkylene oxide-polyhydric initiator condensation reaction is carried out in the presence of a double metal cyanide catalyst. The double metal cyanide complex class catalysts suitable for use and their preparation are described in U.S. Pat. Nos. 4,472,560 and 4,477,589 to Shell Chemical Company and U.S. Pat. Nos. 3,941,849; 4,242,490 and 4,335,188 to The General Tire & Rubber Company. The teachings of the foregoing patents are incorporated herein by reference.

One double metal cyanide complex catalyst found particularly suitable for use is a zinc hexacyanometallate of formula:

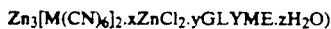

$Zn_3[M(CN)_6]_2 \cdot xZnCl_2 \cdot yGLYME \cdot zH_2O$ wherein M may be Co(III), or Cr(III) or Fe(II) or Fe(III); x, y, and z may be fractional numbers, integers, or zero and vary depending on the exact method of preparation of the complex.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE I

Preparation of a High Molecular Weight Polyol Using a Double Metal Cyanide Catalyst A propoxylated glycerine precursor 100 g (133.6 eg wt, 0.748 eg) was added to a 1 liter autoclave. Zinc hexacyanocobaltate (0.3 g) was added and the autoclave was flushed with nitrogen three times. The mixture was heated to 100° C. Propylene oxide (30.0 g) was added and it reacted as evidenced by a drop in pressure. PO was fed into the reactor at a rate to maintain the pressure below 20 psi and 609.0 g of PO was added within two hours. At this point 548.0 g of the mixture was removed to allow space for more epoxide leaving 162.1 grams in the reactor. An additional 340.0 g of propylene oxide was fed into the reactor over a period of 1.5 hours to produce a polyol with a molecular weight of 10,000, hydroxyl number 16.8.

EXAMPLE II

Polyol Treatment with Sulfuric Acid

The polyol prepared in Example I was analyzed by X-ray fluorescence and found to contain colbalt (18 ppm) and zinc (43 ppm). The polyol (500.0 g) was heated to 100° C. and sulfuric acid (1.3 g, 0.26 wt %) was added The mixture was heated for 4 hours. MAGNESOL (7.5 g, 1.5 wt %) and CELITE (3.8 g, 0.75 wt %) were added and the mixture was vacuum stripped for 1 hour then filtered. The product was analyzed by X-ray fluorescence and found to contain 0 ppm cobalt and 0 ppm zinc.

EXAMPLE III

Polyol Treatment with Hydrogen Peroxide

A polyol (500.0 g) prepared as described in Example I containing 18 ppm cobalt and 43 ppm zinc was heated to 110° C. and 30% hydrogen peroxide (3.0 g, 0.2 wt% ($H_2O_2$) was added. The mixture was heated at 110° C. for 1 hour and then CELITE (10.0 g, 2 wt %) was added and the mixture was vacuum stripped for one hour and filtered. A clear polyol containing 0 ppm cobalt and 0 ppm zinc was obtained

EXAMPLE IV

Polyol Treatment with Hydrogen Peroxide and Sulfuric Acid Mixtures

A polyol (500.0 g) prepared as described in Example I containing 18 ppm cobalt and 43 ppm zinc was heated to 110° C. and sulfuric acid (0.5 g, 0.1 wt %) was added. The mixture was heated at 110° C. for 4 hours and then 30% hydrogen peroxide (0.66 g, 0.04 wt %) was added. The mixture was heated one hour and MAGNESOL (10.0 g, 2 wt %) and CELITE (5.0 g, 1 wt %) were added and the mixture was vacuum stripped for 1 hour. The mixture was filtered to yield a clear polyol containing 0 ppm cobalt and 0 ppm zinc.

EXAMPLE V

Polyol Treatment with Air

A polyol (500.0 g) prepared as described in Example I was heated to 110° C. and air was added via a gas dispersion tube with rapid stirring for 4 hours. CELITE (10.0 g, 2 wt %) was added and the mixture was vacuum stripped for 1 hour and filtered. The clear polyol mixture was analyzed and found to contain 0 ppm cobalt and 0 ppm zinc.

EXAMPLE VI

Polyol Treatment with Hydrochloric Acid

A polyol (500.0 g) prepared as described in Example I containing 18 ppm cobalt and 43 ppm zinc was heated to 110° C. and treated with aqueous hydrochloric acid (13.5 g, 2.7 wt %) and the mixture was heated for two hours. MAGNESOL (10.0 g, 2 wt %) and CELITE (5.0 g, 1 wt %) were added, the mixture was vacuum stripped and filtered. The clear polyol was analyzed and found to contain 12 ppm colbalt and 15ppm zinc.

EXAMPLE VII

Polyol Treatment with OXONE

A polyol (500.0 g) prepared as described in Example I, containing 27 ppm cobalt and 68 ppm zinc, was heated at 110° C., and treated with OXONE (18.4 g, 3.7wt %). The mixture was heated 3 hours at 110° C., MAGNESOL (10.0 g, 2 wt %) and CELITE (5.0 g, 1 wt %) were added, and then the mixture was vacuum stripped. After 1 hour the mixture was filtered. The clear polyol was found to contain 7 ppm cobalt and 12 ppm zinc.

EXAMPLE VIII

Comparative Example No Oxygen Containing Gas, Polyol Treatment with MAGNESOL Under Nitrogen, Catalyst Not Removed A polyol (500.0 g) prepared as described in Example I containing 27 ppm cobalt and 68 ppm zinc was heated to 110° C. and MAGNESOL (10.0 g, 2 wt %) and CELITE (5.0 g, 1 wt %) were added. The mixture was stirred under nitrogen at 110° C. for two hours then vacuum stripped and filtered. The polyol was found to contain 25 ppm cobalt and 60 ppm zinc.

What is claimed is:

1. A process for removing double metal cyanide complex catalyst residue(s) from polyol(s) which comprises after polyol formation the steps of:
   (a) contacting the catalyst residue-containing polyol with an effective amount of an oxidant to cause said residue(s) to form insoluble residues that are insoluble in the polyol, and
   (b) separating the insoluble residues from the polyol, wherein said oxidant is an oxygen-containing gas, and wherein said oxygen-containing gas is selected from the group consisting of oxygen, air, ozone, and combinations thereof.

2. The process of claim 1 wherein said separating is effected by filtration, extraction, centrifugation, or a combination thereof.

3. The process of claim 2 wherein filtration is used, and a filter aid is additionally employed.

4. The process of claim 1 wherein said oxidant is employed in a total amount of between about 5% and about 0.02% based upon the weight of the polyol.

5. A process for removing double metal cyanide complex catalyst residue(s) from polyol(s) which comprises after polyol formation the steps of:
   (a) contacting the catalyst residue-containing polyol with an effective amount of an oxidant to cause said residue(s) to form insoluble residues that are insoluble in the polyol, and
   (b) separating the insoluble residues from the polyol, wherein said oxidant is an acid, and wherein said acid is selected from the group consisting of sulfuric acid, phosphoric acid, hydrochloric acid, nitric acid, antimony pentachloride, boron trifluoroetherate, toluene sulfonic acid, other aryl and alkyl sulfonic acids, and combinations thereof.

6. The process of claim 5 wherein said separating is effected by filtration, extraction, centrifugation, or a combination thereof.

7. The process of claim 6 wherein filtration is used, and a filter aid is additionally employed.

8. The process of claim 5 wherein said oxidant is employed in a total amount of between about 5% and about 0.02% based upon the weight of the polyol.

9. A process for removing double metal cyanide complex catalyst residue(s) from polyols(s) which comprises after polyol formation the steps of:
   (a) contacting the catalyst residue-containing polyol with an effective amount of an oxidant to cause said residue(s) to form insoluble residues that are insoluble in the polyol, and
   (b) separating the insoluble residues from the polyol, wherein said oxidant is a peroxide, and wherein said peroxide is selected from the group consisting of t-butyl peroxide, t-butyl peroxypivalate, decanoyl peroxide, lauroyl peroxide, propionyl peroxide, acetyl peroxide, and combinations thereof.

10. The process of claim 9 wherein said separating is effected by filtration, extraction, centrifugation, or a combination thereof.

11. The process of claim 10 wherein filtration is used, and a filter aid is additionally employed.

12. The process of claim 9 wherein said oxidant is employed in a total amount of between about 5% and about 0.02% based upon the weight of the polyol.

13. A process for removing double metal cyanide complex catalyst residue(s) from polyol(s) which comprises after polyol formation the steps of:
   (a) contacting the catalyst residue-containing polyol with an effective amount of an oxidant to cause said residue(s) to form insoluble residues that are insoluble in the polyol, and
   (b) separating the insoluble residues from the polyol, wherein said oxidant is a hydroperoxide, and wherein said hydroperoxide is selected from the group consisting of: hydrogen peroxide, alkyl and aryl hydroperoxides, and combinations thereof.

14. The process of claim 13 wherein said separating is effected by filtration, extraction, centrifugation, or a combination thereof.

15. The process of claim 14 wherein filtration is used, and a filter aid is additionally employed.

16. The process of claim 13 wherein said oxidant is employed in a total amount of between about 5% and about 0.02% based upon the weight of the polyol.

17. A process for removing double metal cyanide complex catalyst residue(s) from polyol(s) which comprises after polyol formation the steps of:
   (a) contacting the catalyst residue-containing polyol with an effective amount of an oxidant to cause said residue(s) to form insoluble residues that are insoluble in the polyol, and (b) separating the insoluble residues from the polyol, wherein said oxidant is a peracid, and wherein said peracid is selected from the group consisting of peralkyl and peraryl acids, and combinations thereof.

18. The process of claim 17 wherein said separating is effected by filtration, extraction, centrifugation, or a combination thereof.

19. The process of claim 18 wherein filtration is used, and a filter aid is additionally employed.

20. The process of claim 17 wherein said oxidant is employed in a total amount of between about 5% and about 0.02% based upon the weight of the polyol.

* * * * *